(12) United States Patent
Inoue et al.

(10) Patent No.: US 6,386,067 B1
(45) Date of Patent: May 14, 2002

(54) TRANSMITTING SYSTEM FOR SMALL-SIZED VEHICLE

(75) Inventors: Koji Inoue; Tokuji Yoshimoto, both of Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 09/707,907

(22) Filed: Nov. 8, 2000

(30) Foreign Application Priority Data

Nov. 11, 1999 (JP) ............................................. 11-320908
Nov. 11, 1999 (JP) ............................................. 11-320909

(51) Int. Cl.[7] ............................................. F16H 47/00
(52) U.S. Cl. ..................................................... 74/730.1
(58) Field of Search ........................................ 74/730.1

(56) References Cited

U.S. PATENT DOCUMENTS 2,800,037 A * 7/1957 Czuba et al. ............... 74/730.1
3,151,717 A * 10/1964 Kaptur et al. ............... 74/730.1
3,161,015 A * 12/1964 Knowles et al. ............ 74/730.1

FOREIGN PATENT DOCUMENTS

JP          57-69163          4/1982

* cited by examiner

*Primary Examiner*—Dirk Wright
(74) *Attorney, Agent, or Firm*—Arent Fox Kintner Plotkin & Kahn, PLLC

(57) ABSTRACT

In a transmitting system for a small-sized vehicle in which a crankshaft and an input shaft of a transmission are connected to each other through a fluid transmitting device such as a torque converter. A primary reducing device, the fluid transmitting device and a shifting clutch are disposed on the crankshaft sequentially from one side of a crankcase supporting the crankshaft with a bearing interposed therebetween toward the outside, and the axial movements of the input member, the pump impeller and the turbine impeller on the crankshaft are restrained by the bearing and a nut threadedly fitted at a tip end of the crankshaft. Thus, a creep phenomenon of the fluid transmitting device can be eliminated by controlling the shifting clutch, and the shifting operation of the transmission can be conducted lightly. Moreover, the transmitting system is of a simple construction and improved in assemblability.

5 Claims, 3 Drawing Sheets

TRANSMITTING SYSTEM FOR SMALL-SIZED VEHICLE

BACKGROUND OF THE INVENTION

1. Field of the Invention

The present invention relates to a transmitting system utilized in a small-sized vehicle such as a two-wheeled motor vehicle and a four-wheel buggy, and particularly, to an improvement in a transmitting system, in which a crankshaft of an engine and an input shaft of a multi-stage transmission disposed in parallel to the crankshaft are connected to each other through a fluid transmitting means including a pump impeller connected to the engine, and a turbine impeller connected to the multi-stage transmission.

2. Description of the Related Art

There is such a conventionally known transmitting system for a small-sized vehicle, in which a fluid transmitting means is comprised of a torque converter, as disclosed in Japanese Patent Application Laid-open No. 57-69163.

In the transmitting system described in the above Japanese Patent Application, the crankshaft of the engine and the input shaft of the multi-stage transmission are connected to each other only through the torque converter, so that a torque shock generated at the start of the vehicle or during the shifting is absorbed by a slipping effect of the torque converter.

However, the torque converter and a fluid coupling have a slipping function, but as long as power is input from the engine, the transmission of a torque is conducted more or less. Therefore, the known transmitting system suffers from the following problem. At the start of the vehicle at which a transmission is switched over from a neutral position to a low position, such a creep phenomenon occurs that power is transmitted to some degree to a driving wheel of the vehicle, even if the engine is in an idling state. Another problem is that during traveling of the vehicle, a friction due to the transmitted torque always occurs at switchover sliding portions of the transmission and hence, the switchover resistance of the transmission is large, and a large shifting load is required. In addition, the torque converter is mounted to the input shaft of the multi-stage transmission driven in a reduced manner from the engine and for this reason, the transmitted torque borne by the torque converter is relatively large and hence, the large-sized torque converter having a large capacity is obliged to be used, which makes it difficult to make compact a power unit including the engine and the transmission.

SUMMARY OF THE INVENTION

Accordingly, it is an object of the present invention to provide a transmitting system of the above-described type for a small-sized vehicle, in which the creep phenomenon is eliminated, and the shifting operation of the transmission can be conducted lightly and moreover, which is of a simple construction and has a good assemblability.

To achieve the above object, according to a first aspect and feature of the present invention, there is provided a transmitting system for a small-sized vehicle in which a crankshaft of an engine and an input shaft of a multi-stage transmission disposed in parallel to the crankshaft are connected to each other through a fluid transmitting means including a pump impeller connected to the engine, and a turbine impeller connected to the multi-stage transmission, wherein a first reducing device, the fluid transmitting means and a shifting clutch which are disposed on the crankshaft of the engine sequentially in the mentioned order from one side wall of a crankcase supporting the crankshaft with a bearing interposed therebetween toward the outside, the shifting clutch having an input member connected to the crankshaft and an output member connected to the pump impeller, the turbine impeller being connected to a driving gear of the primary reducing device, a driven gear of the primary reducing device being connected to the input shaft of the transmission, wherein the axial movements of the input member, the pump impeller and the turbine impeller on the crankshaft are restrained by the bearing and a nut threadedly fitted at a tip end of the crankshaft.

With the first feature, during idling of the engine, the transmission of power to the shifting clutch and the like can be cut off, even when the transmission is in a low position, irrespectively of the presence of the fluid transmitting means, by controlling the shifting clutch to its turned-off state, thereby preventing a creep phenomenon. During a shifting operation, the transmission can be brought into an unloaded state, irrespective of the presence of the fluid transmitting means, by first controlling the shifting clutch to its turned-off state, whereby the shifting operation can be conducted lightly without being attended with a torque shock.

Moreover, the crankshaft is rotated at a high speed from the input shaft of the transmission driven through the reducing device by the crankshaft and hence, the transmitted torque borne by the fluid transmitting means and the shifting clutch mounted to the crankshaft is relatively small. Therefore, the capacities of the fluid transmitting means and the shifting clutch can be correspondingly reduced, leading to the compactness of the fluid transmitting means and the shifting clutch, and the power unit can be constructed compact, despite the provision of both the fluid transmitting means and the shifting clutch.

In addition, the primary reducing device is disposed at a location nearest to a sidewall of the crankcase and hence, a bending moment applied to the crankshaft and the input shaft of the transmission with the operation of the primary reducing device can be minimized. The fluid transmitting means has a weight larger than that of the shifting clutch, but is disposed at a location nearer to the sidewall of the crankcase than the shifting clutch. Therefore, the bending moment applied to the crankshaft can be minimized by the weights of the fluid transmitting means and the shifting clutch. As a result, it is possible to contribute to an enhancement in durability of the crankshaft, the input shaft of the transmission and the bearing supporting them in cooperation with the compactness of the fluid transmitting means and the shifting clutch.

Further, the input member, the pump impeller, the turbine impeller and the driving gear can be mounted to the crankshaft by the single nut, thereby simultaneously providing the simplification of the construction and an enhancement in assemblability.

Moreover, a thrust load generated between the pump impeller and the turbine impeller is borne by the crankshaft through the bearing and the nut and hence, it is possible to alleviate the load to be borne on the crankcase to contribute to an enhancement in durability of the crankcase.

According to a second aspect and feature of the present invention, in addition to the first feature, the crankshaft includes a large-diameter shaft portion located adjacent to the bearing, a small-diameter shaft portion connected to a tip end of the large-diameter shaft portion through a step, and wherein the input member is clamped and fixed on the small-diameter shaft portion by the step and the nut threadedly fitted at a tip end of the small-diameter shaft portion, and the axial movements of the pump impeller and the turbine impeller are restrained by the bearing and the input member.

With the second feature, the input member can be firmly fixed to the crankshaft by the step on the crankshaft and the nut. Moreover, the input member and the bearing restrain the axial movements of the pump impeller and the turbine impeller. Therefore, exclusive retaining members for these impellers are not required, leading to a simplified construction.

According to a third aspect and feature of the present invention, there is provided a transmitting system for a small-sized vehicle in which a crankshaft of an engine and an input shaft of a multi-stage transmission are connected to each other through a fluid transmitting means including a pump impeller connected to the crankshaft, and a turbine impeller connected to the input shaft, wherein a shifting clutch is interposed between the crankshaft and the input member in a series relation to the fluid transmitting means, the fluid transmitting means and the shifting clutch being disposed coaxially, so that a portion of an outer surface of the bowl-shaped pump impeller of the fluid transmitting means is received in a recess existing in one side of the shifting clutch.

The fluid transmitting means corresponds to a torque converter in each of embodiments of the present invention, which will be described hereinafter.

With the third feature, during idling of the engine, the transmission of power to the shifting clutch and the like, even when the transmission is in a low position, can be cut off, irrespectively of the presence of the fluid transmitting means, by controlling the shifting clutch to its turned-off state, thereby preventing a creep phenomenon. During a shifting operation, the transmission can be brought into an unloaded state, irrespective of the presence of the fluid transmitting means, by first controlling the shifting clutch to its turned-off state, whereby the shifting operation can be conducted lightly without being attended with a torque shock.

Moreover, when the fluid transmitting means and the shifting clutch are disposed coaxially, a portion of the outer surface of the bowl-shaped pump impeller of the fluid transmitting means is received in the recess existing in one side of the shifting clutch. Therefore, the recess in one side of the shifting clutch, i.e., a dead space, can be utilized effectively for the disposition of the pump impeller, leading to the compactness of the entire transmitting system.

According to a fourth aspect and feature of the present invention, in addition to the third feature, the recess is an opening in a bottomed cylindrical clutch casing of the shifting clutch.

With the fourth feature, a relatively large dead space present in the opening in the clutch casing can be utilized effectively for the disposition of the pump impeller, thereby effectively providing the compactness of the entire transmitting system.

According to a fifth aspect and feature of the present invention, in addition to the fourth feature, the pump impeller and the shifting clutch are connected to each other within the opening.

With the fifth feature, the opening can be utilized for the disposition of connected portions of the pump impeller and the shifting clutch, thereby providing not only the compactness of the entire transmitting system, but also an enhancement in connecting assemblability of the pump impeller and the shifting clutch.

The fluid transmitting means corresponds to each of torque converters T, T' in first and second embodiments of the present invention, which will be described hereinafter; the input member of the shifting clutch corresponds to a clutch casing 27 in the first embodiment and a driving plate 81 in the second embodiment; and the output member of the shifting clutch corresponds to a friction clutch plate 23 in the first embodiment and an output member 84 in the second embodiment.

The above and other objects, features and advantages of the invention will become apparent from the following description of the preferred embodiment taken in conjunction with the accompanying drawings.

DESCRIPTION OF THE PREFERRED EMBODIMENTS

A first embodiment of the present invention will be described with reference to FIGS. 1 to 2.

Figure 1:
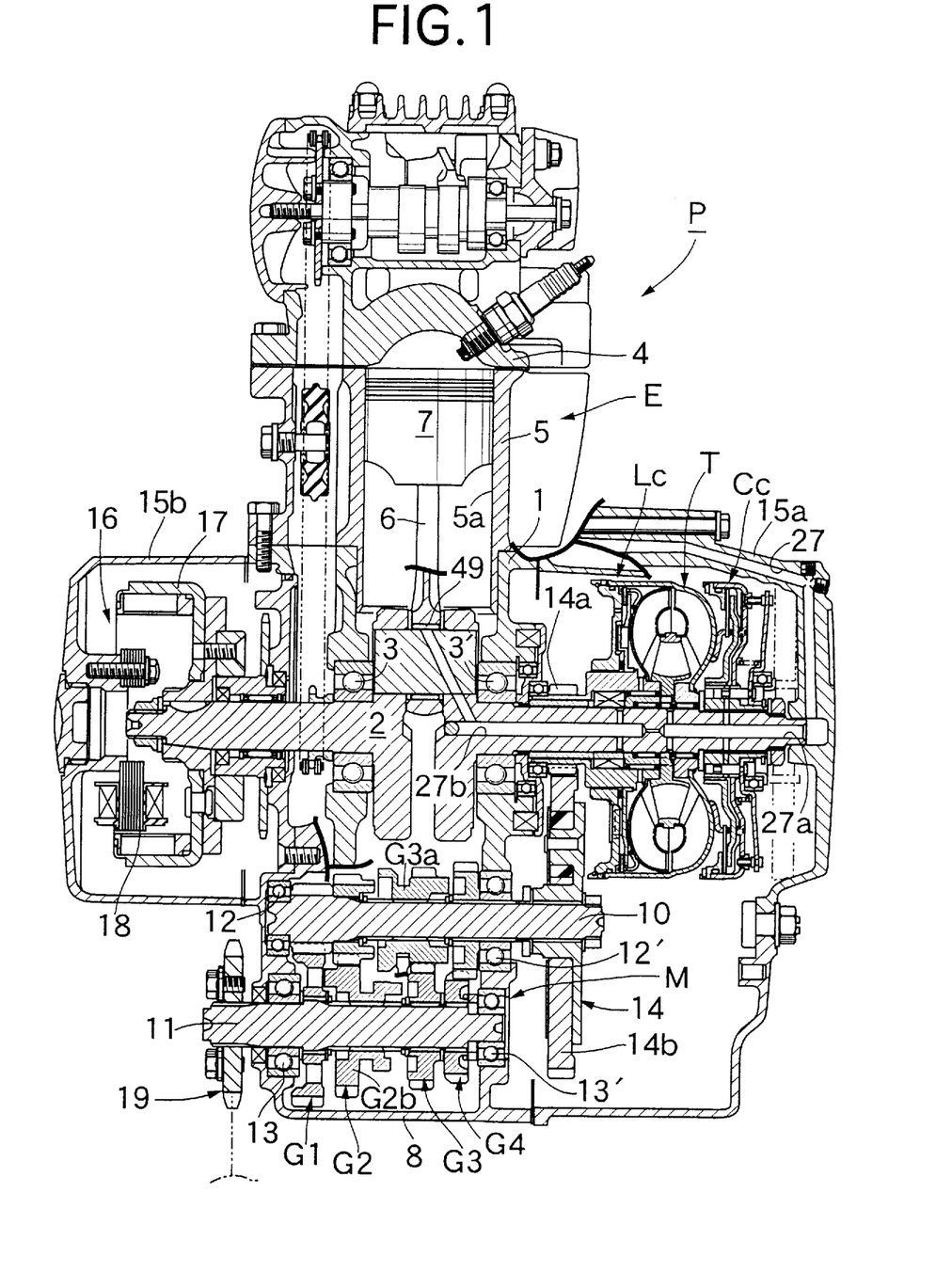
FIG. 1 is a vertical sectional plan view of a power unit for a motorcycle, showing a first embodiment of the present invention.

Referring first to FIG. 1, a power unit P for a motorcycle is comprised of an engine E and a multi-stage transmission M, which are provided integrally with each other. The engine E includes a crankshaft 2 carried in a crankcase 1 with a pair of left and right ball bearings 3 and 3' interposed therebetween, as conventionally usual, and a piston 7 slidably received in a cylinder bore 5a in a cylinder block 5 and connected to the crankshaft 2 through a connecting rod 6. The crankshaft 2 is disposed to face in a lateral direction of the motorcycle.

A transmission case 8 is integrally connected to the crankcase 1, and an input shaft 10 and an output shaft 11 of the multi-stage transmission M are disposed in parallel to the crankshaft 2 and carried on left and right opposite sidewalls of the transmission case 8 with ball bearings 12, 12'; 13, 13' interposed therebetween. A first-shift gear train G1, a second-shift gear train G2, a third-shift gear train G3 and a fourth-shift gear train G4 are disposed on the input shaft 10 and the output shaft 11 sequentially from a left side as viewed in FIG. 1. A driven gear G2b of the second-shift gear train G2 and a driving gear G3a of the third-shift gear train G3 serve as shifting gears, respectively. When both of the shifting gears G2b and G3a are in neutral positions, the transmission M is in a neutral state. When the shifting gear G2b is moved leftwards or rightwards as viewed in FIG. 1, the first-shift gear train G1 or the third-shift gear train G3 is established. When the shifting gear G3a is moved leftwards or rightwards, the second-shift gear train G2 or the fourth-shift gear train G4 is established. The shifting gears G2b and G3a are operated by a known pedal-operated or manually operated changing device which is not shown.

The crankshaft 2 and the input shaft 10 of the transmission M are connected to each other at a location on the right of the crankcase 1 through a shifting clutch Cc, a torque converter T and a primary reducing device 14 which are connected in series to one another outside the crankcase 1 and the transmission case 8. In this case, particularly, the shifting clutch Cc, the torque converter T and a driving gear 14a of the primary reducing device 14 are mounted on the crankshaft 2 in an order of the driving gear 14a, the torque converter T and the shifting clutch Cc from the side of the right sidewall of the crankcase i toward the outside. A right side cover 15a. is coupled to right end surfaces of the crankcase 1 and the transmission case 8 to cover the driving gear 14a, the torque converter T and the shifting clutch Cc.

A rotor 17 of a generator 16 is secured to a left end of the crankshaft 2, and a stator 18 of the generator 16 is mounted to a left side cover 15b, which is coupled to a left end surface of the crankcase 1 to cover the generator 16.

A chain-type finally reducing device 19 for driving a rear wheel (not shown) of the motorcycle is connected to a left end of the output shaft 11 of the transmission M outside the transmission case 8.

Figure 2:
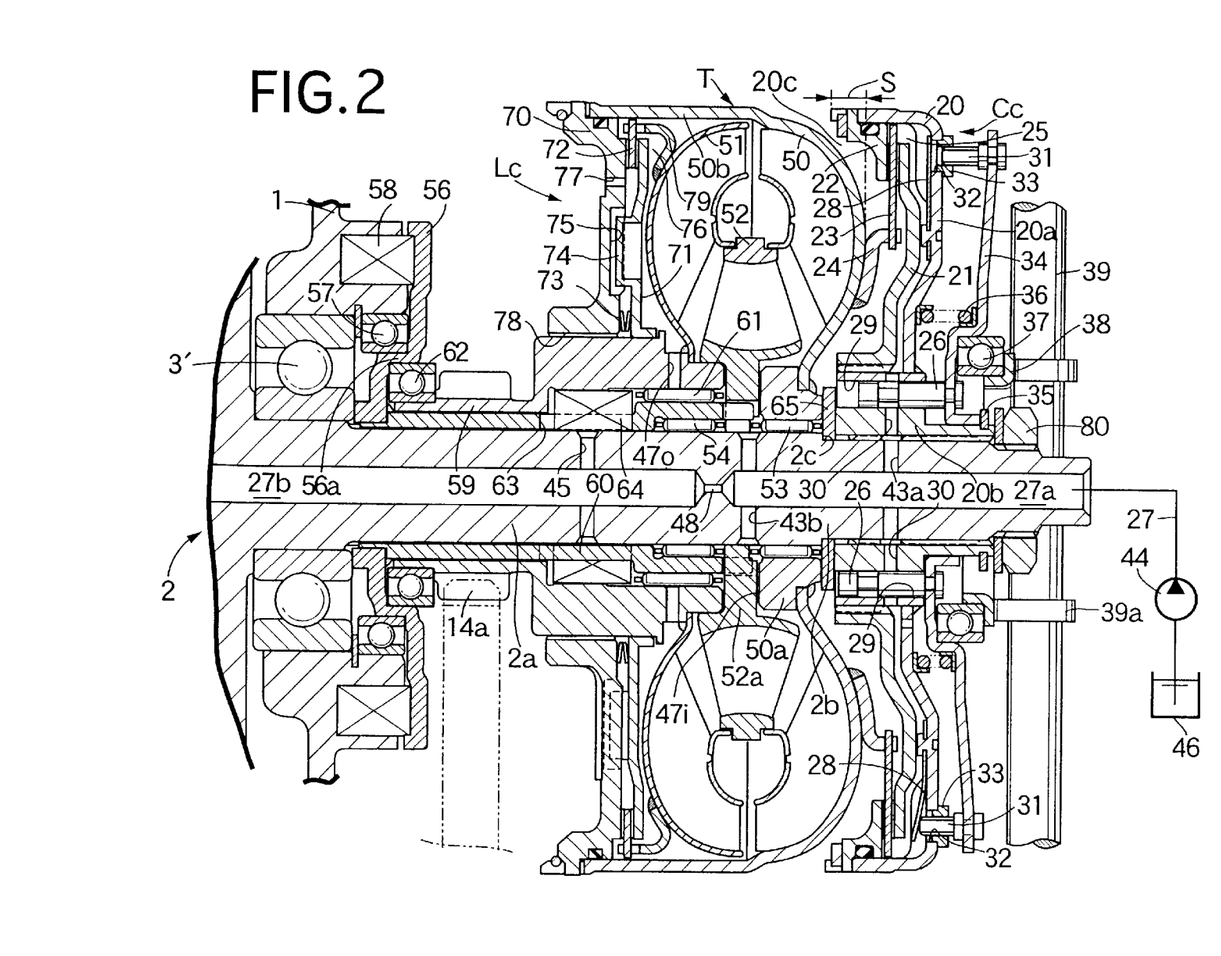
FIG. 2 is an enlarged vertical sectional view of a transmitting system of the power unit.

Referring to FIG. 2, a section of the crankshaft 2 protruding rightwards and outwards of the crankcase 1 comprises a large-diameter shaft portion 2a adjacent to the bearing 3' and a small-diameter shaft portion 2b connected to a tip end of the large-diameter shaft portion 2a through an annular step 2c.

The shifting clutch Cc includes a cylindrical clutch casing 20 which has an end wall 20a at one end and a boss 20b provided at its central portion, a pressing plate 21 disposed within the clutch casing 20 and slidably spline-coupled to an outer periphery of the boss 20b, a receiving plate 22 oil-tightly secured to an opened end of the clutch casing 20, and an annular friction clutch plate 23 interposed between the pressing plate 21 and the receiving plate 22. The clutch casing has a boss 20b which is spline-fitted over the small-diameter shaft portion 2b and disposed so that its front end surface abuts against the annular step 2c of the crankshaft 2 with a seat plate 65 sandwiched therebetween. The boss 20b is fastened at its rear end surface by a nut 80 threadedly fitted at a tip end of the small-diameter shaft portion 2b. In this manner, the clutch casing 20 is clamped and fixed on the crankshaft 2 by the annular step 2c and the nut 80.

A transmitting plate 24 (which will be described hereinafter) of the pump impeller 50 is spline-engaged with an inner peripheral portion of the friction clutch plate 23.

The pressing plate 21 defines a hydraulic pressure chamber 25 between the pressing plate 21 itself and an end wall 20a and a peripheral wall of the clutch casing 20. The hydraulic pressure chamber 25 is connected to a first inlet bore 43a in the crankshaft 2 through an inlet valve 26 mounted on the boss 20b of the clutch casing 20, and opened to the outside of the clutch casing 20 through an outlet valve 28 mounted on an outer peripheral portion of the end wall 20a.

The boss 20b is provided with a plurality of valve bores 29 extending in parallel to the crankshaft 2, and a plurality of through-bores 30 extending via each of the valve bores 29 and through the inlet bore 43a to the hydraulic pressure chamber 25. The inlet valve 26 comprising a spool valve is slidably received in each of the valve bores 29. When the inlet valves 26 assume rightward-moved positions as viewed in FIG. 2 (see the inlet valve 26 at an upper portion of FIG. 2), the through-bores 30 are opened. When the inlet valves 26 assume leftward-moved positions (see the inlet valve 26 at a lower portion of FIG. 2), the through-bores 30 are closed. To ensure the communication between the through-bores 30 in the boss 20b and the first inlet bore 43a in the crankshaft 2, it is effective to cut off a tooth or teeth at a portion of each of mutually fitted spline sections of the crankshaft 2 and the boss 20b.

A plurality of outlet bores 32 are provided at circumferentially equal distances in the outer peripheral portion of the end wall 20a of the clutch casing 20, and an outlet valve 28 comprising a reed valve is caulked at one end to the end wall 20a, and is capable of opening and closing the outlet bore 32 on the side of the hydraulic pressure chamber 25.

A guide collar 33 inserted through each of the outlet bores 32 is further secured to the end wall 20a, and a valve-opening bar 31 is slidably fitted into each of the guide collars 33. The valve opening bar 31 has, in its outer peripheral surface, an axial groove enabling an oil flow within the guide collar 33. When the valve-opening bar 31 assumes a rightward-moved position as viewed in FIG. 2 (see the valve-opening bar 31 at an upper portion of FIG. 2), the outlet valve 28 is permitted to close the outlet bore 32 by an own resilient force of the outlet valve 28. When the valve opening bar 31 assumes a leftward-moved position (see the valve-opening bar 31 at a lower portion of FIG. 2), the outlet valve 28 is flexed inwards of the hydraulic pressure chamber 25 to open the outlet bore 32.

A common valve-operating plate 34 is connected to outer ends of the inlet valve 26 and the valve opening bar 31. The valve-operating plate 34 is laterally (as viewed in FIG. 2) slidably carried on the boss 20b of the clutch casing 20, and a stop ring 35 defining a rightward-moved position for the valve-operating plate 34 is locked on the boss 20b. A return spring 36 for biasing the valve-operating plate 34 toward the stop ring 35 is mounted under compression between the clutch casing 20 and the valve-operating plate 34.

An urging ring 38 is mounted on the valve-operating plate 34 with a release bearing 37 concentrically surrounding the boss 20b being interposed therebetween. An arm 39a fixedly provided on a shifting-clutch operating cam shaft 39 is engaged on an outer end surface of the urging ring 38, so that the valve-operating plate 34 can be moved laterally along with the inlet valve 26 and the valve-opening bar 31 in cooperation with the return spring 36 by reciprocally turning the shifting-clutch operating cam shaft 39.

An electric or electromagnetic clutch actuator (not shown) is connected to the shifting-clutch operating camshaft 39 for turning the shifting-clutch operating camshaft 39 during idling of the engine E or during shifting operation of the transmission M.

When the engine E is in a usual operated state, the valve-operating plate 34 is retained at a retracted position, i.e., a rightward-moved position as a viewed in FIG. 2 (see the valve-operating plate 34 at the upper portion of FIG. 2) under the action of a biasing force of the return spring 36 to open the inlet valve 26 and to permit the closing of the outlet valve 28. Therefore, an oil pumped from an oil pump 44 is supplied from an upstream supply oil passage 27a via the first inlet bore 43a and the through-bore 30 into the hydraulic pressure chamber 25 in the clutch casing 20 to fill the chamber 25.

The clutch casing 20 is rotated along with the crankshaft 2 and hence, the oil in the hydraulic pressure chamber 25 in the clutch casing 20 receives a centrifugal force to generate a hydraulic pressure, and the pressing plate 21 urges the friction clutch plate 23 against the receiving plate 22 with such hydraulic pressure, whereby the pressing plate 21, the receiving plate 22 and the friction clutch plate 23 are brought into frictional engagement with one another. In other words, the shifting clutch Cc is brought into a turned-on state to transmit an output torque from the crankshaft 2 through the friction clutch plate 23 to the torque converter T.

On the other hand, during idling of the engine E or during shifting operation of the transmission M, the shifting-clutch operating cam shaft 39 is turned by the clutch actuator to move the valve-operating plate 34 to the leftward-moved position as viewed in FIG. 2 (see the valve-operating plate 34 at the lower portion of FIG. 2), thereby closing the inlet valve 26 and opening the outlet valve 28. As a result, the supplying of the oil from the upstream supply oil passage 27a to the hydraulic pressure chamber 25 is cut off, and the oil in the hydraulic pressure chamber 25 is discharged through the outlet bore 32 to the outside of the clutch casing 20, whereby the hydraulic pressure in the hydraulic pressure chamber 25 is reduced, and the urging force of the pressing plate 21 to the friction clutch plate 23 is reduced remarkably. Therefore, the frictional engagement of the pressing plate 21, the receiving plate 22 and the friction clutch 23 with one another are released. In other words, the shifting clutch Cc is brought into a turned-off state and hence, the transmission of the torque from the crankshaft 2 to the torque converter T is cut off. The oil discharged to the outside of the clutch casing 20 is circulated to an oil reservoir 46.

When the rotation of the engine is accelerated for starting a vehicle, or the shifting operation is completed from the above state, the clutch actuator is immediately returned to a non-operated state, and the valve-operating plate 34 is retracted at a stretch to the rightward-moved position by the biasing force of the return spring 36 to open the inlet valve again and to close the outlet valve 28. Therefore, as can be seen from the above-described operation, the shifting clutch Cc is restored from the turned-off state to the turned-on state without passing through a clutch-slipping state. Namely, the shifting clutch Cc is of an on/off type having no clutch-slipping region and has a torque capacity set larger than that of the torque converter T.

Referring again to FIG. 2, the torque converter T is comprised of a pump impeller 50, a turbine impeller 51 and a stator impeller 52. The pump impeller 50 is disposed adjacent to the receiving plate 22 and has a boss 50a supported on the large-diameter shaft portion 2a of the crankshaft 2 with a needle bearing 53 interposed therebetween. The transmitting plate 24 spline-engaged with the inner periphery of the friction clutch plate 23 is secured to an outer surface of the pump impeller 50. Therefore, a torque from the friction clutch plate 23 is transmitted through the transmitting plate 24 to the pump impeller 50.

A stator shaft 60 is disposed between the boss 50a of the pump impeller 50 and the ball bearing 3' supporting the crankshaft 2, and is supported at its right end on the large-diameter shaft portion 2a of the crankshaft 2 with a needle baring 54 interposed therebetween. A boss 52a of the stator impeller 52 is connected to the stator shaft 60 by a concave-convex engagement. A stator arm plate 56 is secured to a left end of the stator shaft 60, and an outer peripheral surface of a cylindrical portion 56a provided at an intermediate portion of the stator arm plate 56 is supported on crankcase 1 with a ball bearing 57 interposed therebetween. An outer periphery of the stator arm plate 56 is supported on the crankcase 1 with a free wheel 58 interposed therebetween.

The turbine impeller 51 opposed to the pump impeller 50 has a turbine shaft 59 integrally provided at a center portion of the turbine impeller 50. The turbine impeller 59 is supported at its right end on the stator shaft 60 with a needle bearing 61 interposed therebetween and is supported at its left end on an inner peripheral surface of the cylindrical portion 56a of the stator arm plate 56 with a ball bearing 62 interposed therebetween. A one-way clutch 64 is mounted between the turbine shaft 59 and the large-diameter shaft portion 2a of the crankshaft 2 to extend through a transverse bore 63 in the stator shaft 60. When a reverse load is applied to the turbine shaft 59, the one-way clutch 64 is turned on to connect the turbine shaft 59 and the crankshaft 2 directly to each other.

The boss 50a of the pump impeller 50 is disposed such that its outer end surface is rotatably carried on the seat plate 65 secured to the annular step 2c of the crankshaft 2. The seat plate 65 is interposed between opposed end surfaces of the stator arm plate 56 and an inner race of the bearing 3' supporting the crankshaft 2, and such inner race supports an outer end surface of the turbine shaft 59 for rotating movement through the seat plate 65, the stator arm plate 56 and the bearing 62. In this manner, the pump impeller 50, the turbine impeller 51 and the stator impeller 52 are retained in an axial direction by the inner race of the bearing 3' and the clutch casing 20.

A clearance between the boss 50a of the pump impeller 50, the turbine shaft 59 and the boss 52a of the stator impeller 52 serves as a fluid inlet 47i in the torque converter T, and a fluid outlet 47o in the torque converter is provided in that portion of the turbine shaft 59, which extends outwards of the turbine impeller 51. The fluid inlet 47i communicates with a second inlet bore 43b in the crankshaft 2, and the fluid outlet 47o communicates with an outlet bore 45 in the crankshaft 2.

Therefore, when the oil supplied from the oil pump 44 to the upstream supply oil passage 27a in the crankshaft 2 enters the second inlet bore 43b, the oil flows through the fluid inlet 47i into an oil chamber defined between the pump impeller 50 and the turbine impeller 51 to fill such oil chamber and a hydraulic pressure chamber 76 in a lockup clutch Lc which will be described hereinafter, and then flows through the fluid outlet 47a via the outlet bore 45 into a downstream supply oil passage 27b in the crankshaft 2.

The driving gear 14a of the primary reducing device 14 is integrally formed on the turbine shaft 59, and a driven gear 14b meshed with the driving gear 14a is spline-coupled to the input shaft 10 of the transmission M. The primary reducing device 14 constructed in the above manner is disposed between the crankcase 1 and the torque converter T.

Thus, when the torque output from the crankshaft 2 is transmitted through the shifting clutch Cc in a turned-on state to the pump impeller 50, such torque is transmitted in a fluidic manner to the turbine impeller 51 under the action of the oil filling the inside of the torque converter T. At this time, if a torque amplifying effect is generated between both of the impellers 50 and 51, an attendant reaction force is borne by the stator impeller 52, and the stator impeller 52 is fixedly supported on the crankcase 1 by a locking action of the free wheel 58. If the torque amplifying effect is not generated, the stator impeller 52 can be raced under the racing action of the free wheel 58. Therefore, the pump impeller 50, the turbine impeller 51 and the stator impeller 52 are rotated in the same direction.

The torque transmitted from the pump impeller 50 to the turbine impeller 51 is transmitted through the primary reducing device 14 to the input shaft 10 of the transmission M and then sequentially via the shifting gear trains G1 to G4 selectively established, the output shaft 11 and the final reducing device 19 to the rear wheel (not shown) to drive the rear wheel.

Upon application of an engine brake during traveling of the vehicle, the one-way clutch 64 is brought into a turned-on state by application of a reverse load torque to the turbine shaft 59. Therefore, the turbine shaft 59 and the crankshaft 2 are connected directly to each other, and the reverse load torque is transmitted to the crankshaft 2 without via the torque converter T, whereby a good engine brake effect can be provided.

A lockup clutch Lc is mounted between the pump impeller 50 and the turbine impeller 51 and capable of connecting the pump impeller 50 and the turbine impeller 51 directly to each other. The lockup clutch Lc includes a cylindrical pump extension 50b which is connected to the outer peripheral portion of the pump impeller 50 to surround the turbine impeller 51, a receiving plate 70 which is rotatably carried on the turbine shaft 59 and oil-tightly coupled to an opened end of the pump extension 50b, a pressing plate 71 which is slidably carried on the turbine shaft 59 and disposed in an opposed relation to an inner surface of the receiving plate 70, an annular friction clutch plate 72 interposed between the pressing plate 71 and the receiving plate 70, and a Belleville return spring 73 interposed between the receiving plate 70 and the pressing plate 71 and for biasing the pressing plate 71 in a direction away from the receiving plate 70. An outer periphery of the friction clutch plate 72 is spline-engaged with an outer peripheral portion of the transmitting plate 79 secured to the outer surface of the turbine impeller 51. The receiving plate 70 and the pressing plate 71 are provided with dogs 74 and recesses 75, whose opposed surfaces are engaged with each other, so that the receiving plate 70 and the pressing plate 71 can be slid axially relative to each other, while being rotated in unison with each other.

A hydraulic pressure chamber 76 is defined in the pump extension 50b by the receiving plate 70. The hydraulic pressure chamber 76 communicates with the insides of the pump impeller 50 and the turbine impeller 51 through opposed clearances in the pump impeller 50 and the turbine impeller 51, so that the oil is filled in the pump impeller 50 and the turbine impeller 51.

The receiving plate 70 is provided with an escape bore 77 permitting an inner periphery of the friction clutch plate 72 to be opened to the outside of the receiving plate 70, and an air vent groove 78 extending axially in an inner peripheral surface of the receiving plate 70.

Thus, when the rotational speed of the pump impeller 50 is lower than a predetermined value, the centrifugal force of the oil filling the hydraulic pressure chamber 76 in the pump extension 50b is small and hence, the hydraulic pressure in the hydraulic pressure chamber 76 is not raised, so that the pressing plate 71 remains returned to the retracted position under the biasing force of the return spring 73 to release the friction clutch plate 72. Therefore, the lockup clutch Lc is in the turned-off state.

During this time, the oil in the hydraulic pressure chamber 76 flows from the escape bore 77 in the receiving plate 70 to the outside, but this does not impede the subsequent raising of the hydraulic pressure of the hydraulic pressure chamber 76, because the amount of oil escaped is extremely small.

When the rotational speed of the pump impeller 50 becomes equal to or higher than the predetermined value, the centrifugal force of the oil in the hydraulic pressure chamber 76 is correspondingly increased to raise the hydraulic pressure of the hydraulic pressure chamber 76. Therefore, the pressing plate 71 is advanced toward the receiving plate 70 by such raised hydraulic pressure, whereby the friction clutch plate 72 is clamped between the pressing plate 71 and the receiving plate 70, and as a result, the lockup clutch Lc is brought into the turned-on state. The lockup clutch Lc brought into the turned-on state connects the pump impeller 50 and the turbine impeller 51 directly to each other. Therefore, it is possible to eliminate the loss of the slipping of the impellers 50 and 51 relative to each other, thereby enhancing the transmitting efficiency.

In this case, the raising of the hydraulic pressure does not occur on the side of the inner periphery of the friction clutch plate 72 due to flowing of the oil from the escape bore 77. Therefore, a large difference in pressure is produced between opposite sides of the pressing plate 71, whereby the clamping of the friction clutch 72 is achieved effectively.

Thus, the lockup clutch Lc can be constructed into a type depending on the pump rotational speed without use of a centrifugal weight by utilizing the centrifugal hydraulic pressure in the hydraulic pressure chamber 76 in the pump extension 50b connected to the pump impeller 50. Therefore, a special control means is not required and moreover, the oil used is a torque converter operating oil. Thus, an exclusive oil pump is not required, and it is possible to provide the lockup clutch Lc of the simple construction at an inexpensive cost.

During operation of the engine E, the oil discharged from the oil pump 44 first flows into the upstream supply oil passage 27a and via the first inlet bore 43a into the hydraulic pressure chamber 25 in the shifting clutch Cc to contribute to the operation and cooling of the shifting clutch Cc, and flows via the second inlet bore 43b into the oil chamber defined between the pump impeller 50 and the turbine impeller 51 and the hydraulic pressure chamber 76 in the lockup clutch Lc to contribute to the operation and cooling of the torque converter T and the lockup clutch Lc. Then, the oil passed from the hydraulic pressure chamber 76 through the outlet bore 45 to the downstream supply oil passage 27b is supplied to the needle bearing 49 provided around an outer periphery of a crank pin to contribute to the lubrication of the needle bearing 49. The oil, which has lubricated the needle bearing 49, is scattered to the surroundings with the rotation of the crankshaft 2 and put into the lubrication of the piston 7 and the like. The oil pump 44 originally serves to supply the lubricating oil to the engine E, but such oil is utilized as oil for operating the shifting clutch Cc, the torque converter T and the lockup clutch Lc. Therefore, it is unnecessary to provide an exclusive oil pump for supplying the operating oil, whereby the construction can be simplified.

The upstream supply oil passage 27a and the downstream supply oil passage 27b provided in the crankshaft 2 communicate directly with each other through an orifice 48, and hence, a portion of the oil fed from the oil pump 44 to the upstream supply oil passage 27a is passed through the orifice 48 directly to the downstream supply oil passage 27b without via the torque converter T and the like. Therefore, the proportion of oil dispensed to the torque converter T and the engine E can be determined as desired by the selection of the orifice 48.

The clutch casing 20 of the shifting clutch Cc is clamped and fixed on the crankshaft 2 by the annular step 2c formed between the large-diameter shaft portion 2a and the small-diameter shaft portion 2b of the crankshaft 2 and a nut 80 threadedly fitted over the small-diameter shaft portion 2b. Therefore, the clutch casing 20 can be firmly secured to the crankshaft 12 by the single nut 80. Moreover, the clutch casing 20 maintains the axial positions of the pump impeller 50, the turbine impeller 51 and the stator impeller 52 by cooperation with the inner race of the bearing 3' supporting the crankshaft 2. Therefore, an exclusive retaining member for the impellers 50, 51 and 52 is not required, whereby not only the simplification of the construction and an enhancement in assemblability can be achieved, but also a thrust load generated between the pump impeller 50 and the turbine impeller 51 can be borne by the crankshaft 2 through the bearing 3' and the nut 80, thereby alleviating the burden of the load on the crankcase 1 to contribute to an enhancement in durability of the crankcase 1.

An opening 20c in the bottomed cylindrical clutch casing 20 of the shifting clutch Cc is a relatively large recess, because the receiving plate 22 fitted to an inner periphery of the opening is annular. The torque converter T and the shifting clutch Cc are coaxially disposed in proximity to each other, so that a portion of the outer surface of a bowl-shaped pump impeller 50 is received in the opening 20c. The transmitting plate 24 and the friction clutch plate 23 are spline-coupled to each other within the opening 20c.

The pump impeller 50 and the clutch casing 20 are axially overlapped on each other by such an amount S that a portion of the pump impeller 50 is received in the opening 20c in the clutch casing 20. In this manner, a dead space within the clutch casing 20 is effectively utilized for the disposition of the pump impeller 50, whereby the compactness of the entire transmitting system can be provided.

The inside of the opening 20c is utilized for the disposition of spline-coupled portions of the transmitting plate 24 and the friction clutch plate 23, whereby not only the compactness of the entire transmitting system but also an enhancement in assemblability of the pump impeller 50 and the shifting clutch Cc can be provided.

A second embodiment of the present invention shown in FIG. 3 will be described below.

A shifting clutch Cc' includes a driving plate 81 spline-coupled to the small-diameter shaft portion 2b of the crankshaft 2, and a bottomed cylindrical clutch casing 83 slidably carried on a support tube 82 which is integrally provided on an outer surface of the driving plate 81 to protrude therefrom. The driving plate 81 is disposed adjacent to an end wall of the clutch casing 83 and has an outer periphery spline-coupled to an inner periphery of the clutch casing 83. A clutch inner 84 is coaxially disposed within the clutch casing 83. A plurality of annular driving friction plates 85 are slidably spline-engaged with an inner periphery of a cylindrical portion of the clutch casing 83, and a plurality of annular driven friction plates 86 are slidably engaged with an outer periphery of the clutch inner 84, in such a manner that the annular driving friction plates 85 and the annular driven friction plates 86 are disposed in an alternately laminated relation. In this case, two driving friction plates 85, 85 are disposed inside and outside the groups of the friction plates 85 and 86, respectively, and a receiving ring 87 opposed to an outer surface of the outermost driving friction plate 85 is locked to the inner periphery of the cylindrical portion of the clutch casing 83.

A spacing spring 88 is mounted under compression between the opposite-side driving friction plates 85, 85 for biasing these driving friction plates 85 away from each other. A flange 84a projectingly provided on the outer periphery of the clutch inner 84 is opposed to the innermost driven friction plate 86.

A plurality of centrifugal weights 89 are swingably mounted to the driving plate 81 by pivots 90, so that an urging arm 89a of each of the centrifugal weights 89 can urge the innermost driving friction plate 85. The support tube 82 of the driving plate 81 is provided with a stopper 91 defining a limit of outward (rightward as viewed in FIG. 3) sliding movement of the clutch casing 83, and a clutch spring 92 is mounted between the driving plate 81 and the clutch casing 83 for biasing the clutch casing 83 toward the stopper 91.

An annular output member 94 is connected to the clutch inner 84 through a known reverse load transmitting screw mechanism 93 and spline-coupled to an outer periphery of a boss 50a of a pump impeller 50 of a torque converter T'.

The clutch casing 83 has a boss 83a protruding on its outer surface, and a release cam 96 is mounted to the boss 83a with a release bearing 95 interposed therebetween. A stationary cam 98 mounted to a right side cover 15a through a regulating bolt 97 is opposed to the release cam 96, and a ball 99 mounted on the stationary cam 98 is engaged in a recess 96a in the release cam 96.

The release cam 96 is turned by a clutch arm (not shown) operated prior to a shifting.

During idling of the engine E, the rotational speed of the driving plate 81 rotated along with the crankshaft 2 is low and the centrifugal force of weight portions of the centrifugal weights 89 is small and hence, the urging force of the urging arms 89a to the driving friction plates 85 is also small. For this reason, the opposite-side driving friction plates 85, 85 are spaced from each other under the action of a biasing force of the spacing spring 88, so that the driven friction plates 86 are released, whereby the shifting clutch Cc' is in its turned-off state. Therefore, the shifting clutch Cc' in the turned-off state cuts off the transmission of a power from the crankshaft 2 to the torque converter T' and hence, it is possible to prevent the forward movement of the vehicle at a very slow speed due to a creep phenomenon of the torque converter T' without operation of a wheel brake.

When the rotational speed of the engine E is increased to a level equal to or higher than a predetermined value, the centrifugal force of the weight portions of the centrifugal weights 89 is increased with the increase in rotational speed of the engine E, whereby the urging arms 89a urge the groups of the driving and driven friction plates 85 and 86 strongly against the receiving ring 87 to bring the driving and driven friction plates 85 and 86 into frictional engagement with one another. Therefore, the shifting clutch Cc' is automatically brought into its turned-on state, whereby the power of the crankshaft 2 is transmitted from the clutch inner 84 through the output member 94 to the torque converter T'.

Figure 3:
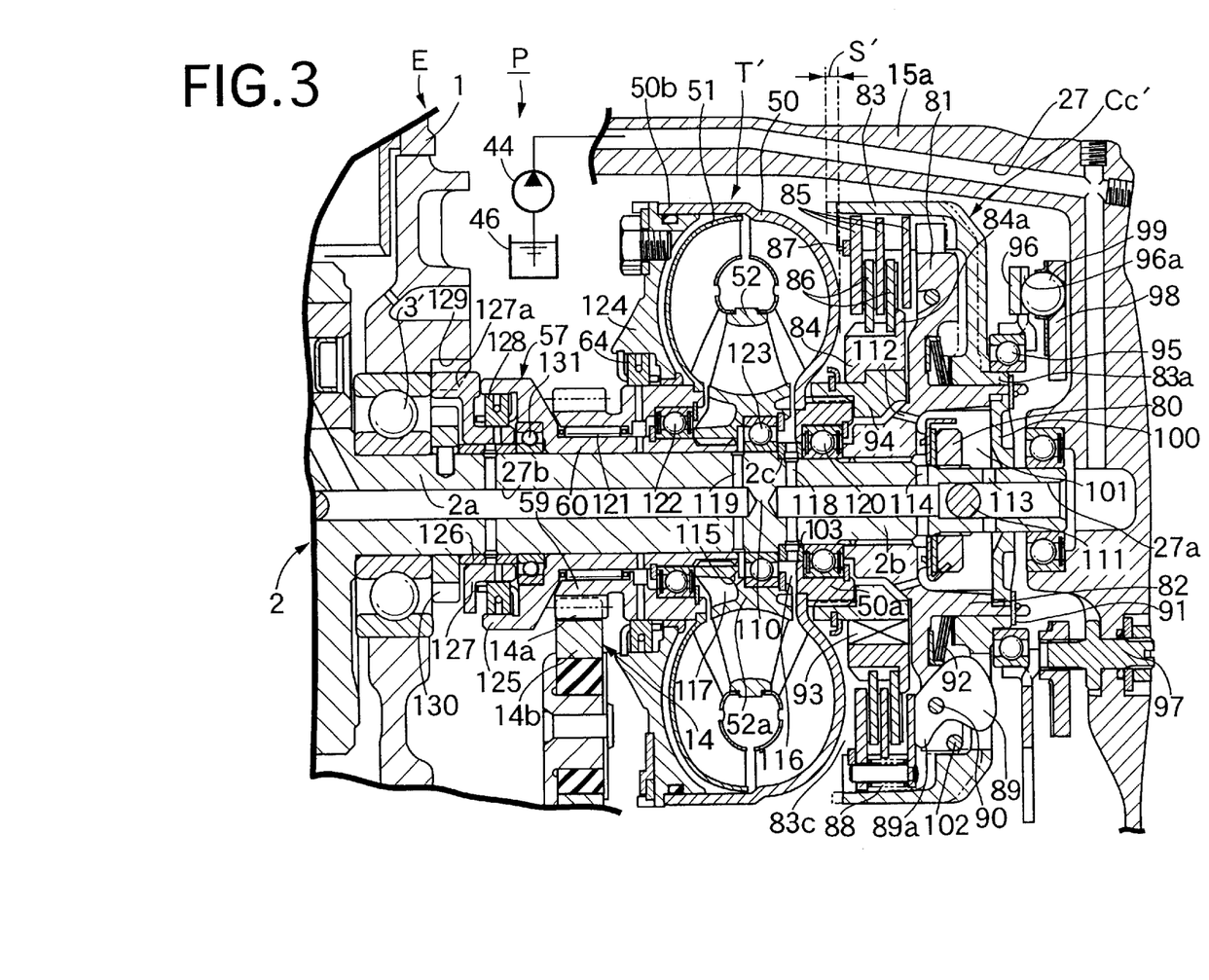
FIG. 3 is a sectional view similar to FIG. 2, but showing a second embodiment of the present invention.

When the urging force of the centrifugal weights 89 to the groups of the driving and driven friction plates 85 and 86 exceeds a set load of the clutch spring 92, the clutch casing 83 is displaced leftwards as viewed in FIG. 3, while flexing the clutch spring 92. Moreover, the centrifugal weights 89 are then received by the stopper ring 102 mounted on the clutch casing 83, so that the further outward swinging movement thereof is inhibited. The force of pressure contact of the driving and driven friction plates 85 and 86 with one another is not increased up to equal to or larger than the load of the clutch spring 92.

In switching over the transmission M, when the release cam 96 is turned by a clutch lever (not shown) prior to such switching-over, the release cam 96 urges the ball 99 on the stationary cam 98 out of the recess 96a, and the resulting reaction force pushes the clutch casing 83 leftwards as shown by a dashed line in FIG. 3 through the release bearing 95 against the load of the clutch spring 92, whereby the receiving ring 87 is spaced from the groups of the driving and driven friction plates 85 and 86. On the other hand, the centrifugal weights 89 is inhibited from being swung outwards by the stopper ring 102 and hence, the urging arms 33a are stopped at the urging position assumed hitherto for the groups of the driving and driven friction plates 85 and 86. Therefore, the driving and driven friction plates 85 and 86 are reliably spaced from one another, whereby the shifting clutch Cc' is turned off.

In this state, the switching-over of the transmission M can be conducted lightly without being influenced by the driving torque of the crankshaft 2.

If the release cam 96 is returned to its original position by the clutch arm after of the switching-over of the transmission M, the shifting clutch Cc' is restored to its turned-on state by cooperation of the biasing force of the clutch spring 92 with the continuing centrifugal force of the centrifugal weights 89 to transmit the driving torque of the crankshaft 2 to the torque converter T'.

In the torque converter T', the boss 50a of the pump impeller 50 which is spline-coupled to the output member 94 is carried on the small-diameter shaft portion 2b of the crankshaft 2 with a ball bearing 120 interposed therebetween, and the turbine shaft 59 connected to the turbine impeller 51 is carried on the stator shaft 60 and the boss 52a of the stator impeller 52 with a needle bearing 121 and a ball bearing 122 interposed therebetween. The boss 52a of the stator impeller 52 is carried on the large-diameter shaft portion 2a of the crankshaft 2 with a ball bearing 123 or a needle bearing interposed therebetween, and is spline-coupled to the stator shaft 60.

A torque converter side cover 124 is oil-tightly coupled to the pump extension 50b connected to the pump impeller 50, and covers the exterior of the turbine impeller 51. A one-way clutch 64 is interposed between the torque converter side cover 124 and the turbine shaft 59 and transmits only a reverse load torque from the turbine shaft 59 to the torque converter side cover 124. Therefore, when a reverse load torque applied to the output shaft 11 is transmitted via the primary reducing device 14 to the turbine shaft 59 during application of an engine brake, the one-way clutch 64 is brought into a connected state to transmit the reverse load torque from the pump extension 50b to the pump impeller 50 and the output member 94.

The outer end of the stator shaft 60 is carried on the large-diameter shaft portion 2a of the crankshaft 2 with a ball bearing 131 interposed therebetween, and the free wheel 57 is interposed between the outer end of the stator shaft 60 and the crankcase 1. The free wheel 57 is comprised of a cup-shaped outer race 125 formed at an outer end of the stator shaft 60 at a diameter larger than the outside diameter of the stator shaft 60, an inner race 127 relatively rotatably carried on the large-diameter shaft portion 2a of the crankshaft 2 within the outer race 125 with a bearing bush 126 interposed therebetween, and a sprag 128 interposed between both of the races 125 and 127. The inner race 127 has a stationary arm 127a projectingly provided at one end thereof to fix the inner race 87 and engaged in a locking groove 129, which is defined in an outer wall of the crankcase 1 at a location adjacent to the stationary arm 127a. The sprag 128 is arranged, so that when the outer race 125 is about to rotate in a direction opposite to a direction of rotation of the pump impeller 50, the sprag locks the outer race 125 to the inner race 127, but permits the rotation of the outer race 125 in the same direction as the direction of rotation of the pump impeller 50.

An oil pump driving gear 130 is keyed to the large-diameter shaft portion 2a of the crankshaft 2 at a location radially inside the stationary arm 127a, and the oil pump 44 is driven by the gear 130.

When the reverse load torque is transmitted to the output member 94, the clutch inner 84 in the shifting clutch Cc' is pushed leftwards as viewed in FIG. 3 by the operation of the screw mechanism 93, whereby the flange 84a of the clutch inner 84 urges the groups of the driving and driven friction plates 85 and 86 against the receiving ring 87, leaving the innermost driving friction plate 85 and hence, the shifting clutch Cc' is brought into its turned-on state. Therefore, the reverse load torque is transmitted to the crankshaft 2, thereby providing a good engine brake effect.

An annular spacer 103 having a diameter larger than that of the large-diameter shaft portion 2a, the inner race of the ball bearing 120 and the driving plate 81 of the shifting clutch Cc' are disposed on the small-diameter shaft portion 2b of the crankshaft 2 sequentially from the side of the annular step 2c, and are clamped and fixed on the small-diameter shaft portion 2b by the annular step 2c and the nut 80 threadedly fitted at the tip end of the small-diameter shaft portion 2b. Therefore, the boss 50a of the pump impeller 50 carried on the ball bearing 120 is axially supported by the spacer 103 and the driving plate 81. In addition, the pump driving gear 130, the bearing bush 126, the ball bearing 131, the stator shaft 60 and the ball bearing 123 are disposed on the large-diameter shaft portion 2a of the crankshaft 2 sequentially from the side of the bearing 3' supporting the crankshaft 2, and their axial movements are restrained by the inner race of the bearing 3' and the spacer 103. Further, the turbine shaft 59 and the boss 52a of the stator impeller 52 are disposed sequentially on the stator shaft 60, and their axial movements are restrained by the ball bearing 123 and the outer race 125 of the free wheel 57. Eventually, the axial movements of the impellers 50, 51 and 52 of the torque converter T' are restrained by the output member 94 of the shifting clutch Cc' and the inner race of the bearing 3'.

Therefore, the driving plate 81 of the shifting clutch Cc' can be secured firmly to the crankshaft 2 by the single nut 80. Moreover, the driving plate 81 cooperates with the inner race of the bearing 3' supporting the crankshaft 2 to maintain the axial positions of the pump impeller 50, the turbine impeller 51 and the stator impeller 52. Therefore, exclusive retaining members for the impellers 50, 51 and 52 are not required and hence, it is possible to provide the simplification of the construction and an enhancement in assemblability, but also it is possible to allow the crankshaft 2 to bear a thrust load which is generated between the pump impeller 50 and the turbine impeller 51 through the bearing 3' and the nut 80, thereby alleviating the load to be borne on the crankcase 1 to contribute to an enhancement in durability of the crankcase 1.

The crankshaft 2 is provided with a partition wall 110 which partitions the upstream and downstream supply oil passages 27a and 27b from each other, and a partition plug 111 is incorporated in the upstream supply oil passage 27a for further dividing the upstream supply oil passage 27a into an upstream portion and a downstream portion.

In the shifting clutch Cc', an oil chamber 101 is defined in the support tube 82 by closing an opened surface of the support tube 82 by a lid 100, and communicates with an inner periphery of the clutch inner 84 through a through-bore 112. The oil chamber 101 communicates with the upstream and downstream portions of the upstream supply oil passage 27a through an inlet bore 113 and an outlet bore 114 provided in the crankshaft 2.

In the torque converter T', first and second small oil chambers 116 and 117 are provided on the right and left of the boss 52a of the stator impeller 52, respectively. The first small oil chamber 116 communicates with an oil chamber defined between the pump impeller 50 and the turbine impeller 51 and also communicates with the downstream portion of the upstream supply oil passage 27a through an inlet bore 118 provided in the crankshaft 2. The second small oil chamber 117 communicates with an oil chamber defined between the turbine impeller 51 and the stator impeller 52 and also communicates with the downstream portion 27b through an outlet bore 119 provided in the crankshaft 2.

Further, the first and second small chambers 116 and 117 communicate with each other through a gap between portions of the bearing 123 and a through-bore 115 provided in the boss 52a.

Thus, when the oil is supplied from the oil pump 44 driven by the engine E through the oil passage 27 to the upstream supply oil passage 27a, such oil flows through the inlet bore 113 into the oil chamber 101 and then diverts into the through-bore 112 and the outlet bore 114. The oil passed through the through-bore 112 is supplied to friction portions and sliding portions of the shifting clutch Cc' and put into the cooling and lubrication of them.

On the other hand, the oil passed through the outlet bore 114 is passed through the downstream portion of the upstream supply oil passage 27a and then from the inlet bore 118 via the first small oil chamber 116 into the oil chamber defined between the pump impeller 50 and the turbine impeller 51 to fill the oil chamber. Then, the oil flows via the second small oil chamber 117 and the outlet bore 119 into the downstream supply oil passage 27b and put into the lubrication of various portion of the engine E.

The direct communication between the upstream and downstream supply oil passages 27a and 27b within the crankshaft 2 is cut off by the partition wall 110 between the inlet bore 118 and the outlet bore 119. Therefore, the oil supplied from the oil pump 44 to the upstream supply oil passage 27a is obliged to be passed through the inside of the torque converter T' through the inlet bore 118 and the outlet bore 119. Thus, even if the oil pump 67 is of a relatively small capacity, a shortage of the operating oil in the torque converter T' can be prevented to the utmost, which is effective for a small-sized vehicle.

In the second embodiment, the shifting clutch Cc' and the torque converter T' are disposed coaxially with each other, so that the outer surface of the bowl-shaped pump impeller 50 faces the opening 83c in the clutch casing 83. The opening 83a in the bottomed cylindrical clutch casing 83 of the shifting clutch Cc' is in the form of a recess at the side of the inner periphery of the receiving ring 87 mounted to the inner periphery of the opening 83c. The shifting clutch Cc' and the torque converter T' are disposed in proximity to each other, so that a portion of the outer surface of the pump impeller 50 is received in the opening 83c in the clutch casing 83 in the turned-off state of the shifting clutch Cc', i.e., in a state (see a dashed line in FIG. 3) in which the clutch casing 83 has been moved toward the pump impeller 50 by cooperation of the stationary cam 98 and the release cam 96 with each other in order to disengage the driving and driven friction plates 85 and 86 from each other. In addition, the transmitting member 94 and the boss 50a of the pump impeller 50 are spline-coupled to each other within the clutch casing 83.

In this manner, the pump impeller 50 and the clutch casing 83 are overlapped axially on each other by such an amount S' that a portion of the pump impeller 50 is received in the opening 83c in the clutch casing 83. Thus, a dead space within the clutch casing 83 is effectively utilized for the disposition of the pump impeller 50, whereby the compactness of the entire transmitting system can be provided.

The inside of the opening 83c is utilized for the disposition of spline-coupled portions of the transmitting plate 94 and the pump impeller 50, whereby not only the compactness of the entire transmitting system but also an enhancement in assemblability of the pump impeller 50 and the shifting clutch Cc' can be provided.

The other constructions are substantially similar to those in the first embodiment and hence, portions or components corresponding to those in the first embodiment are designated by like reference characters and the description of them is omitted.

Although the embodiments of the present invention have been described in detail, it will be understood that the present invention is not limited to the above-described embodiments, and various modifications in design may be made without departing from the spirit and scope of the invention defined in claims. For example, the torque converter T, T' can be replaced by a fluid coupling having no torque amplifying function.

What is claimed is:

1. A transmitting system for a small-sized vehicle in which a crankshaft of an engine and an input shaft of a multi-stage transmission disposed in parallel to said crankshaft are connected to each other through a fluid transmitting means including a pump impeller connected to the engine, and a turbine impeller connected to the multi-stage transmission, wherein a first reducing device, the fluid transmitting means and a shifting clutch are disposed on said crankshaft of the engine sequentially in the mentioned order from one side wall of a crankcase supporting said crankshaft with a bearing interposed therebetween toward the outside, said shifting clutch having an input member connected to said crankshaft and an output member connected to said pump impeller, said turbine impeller being connected to a driving gear of said primary reducing device, a driven gear of said primary reducing device being connected to said input shaft of the transmission, wherein the axial movements of said input member, said pump impeller and said turbine impeller on said crankshaft are restrained by said bearing and a nut threadedly fitted at a tip end of said crankshaft.

2. A transmitting system for a small-sized vehicle according to claim 1, wherein said crankshaft includes a large-diameter shaft-portion located adjacent to said bearing, and a small-diameter shaft portion connected to a tip end of said large-diameter shaft portion through a step, and wherein said input member is clamped and fixed on said small-diameter shaft portion by said step and said nut threadedly fitted at a tip end of said small-diameter shaft portion, and the axial movements of said pump impeller and said turbine impeller are restrained by said bearing and said input member.

3. A transmitting system for a small-sized vehicle in which a crankshaft of an engine and an input shaft of a multi-stage transmission are connected to each other through a fluid transmitting means including a pump impeller connected to said crankshaft, and a turbine impeller connected to said input shaft, wherein a shifting clutch is interposed between said crankshaft and said input shaft in a series relation to said fluid transmitting means, said fluid transmitting means and said shifting clutch being disposed coaxially, so that a portion of an outer surface of the bowl-shaped pump impeller of said fluid transmitting means is received in a recess existing in one side of said shifting clutch.

4. A transmitting system for a small-sized vehicle according to claim 3, wherein said recess is an opening in a bottomed cylindrical clutch casing of said shifting clutch.

5. A transmitting system for a small-sized vehicle according to claim 4, wherein said pump impeller and said shifting clutch are connected to each other within said opening.

* * * * *